United States Patent
Sreenivasan et al.

(10) Patent No.: US 11,936,754 B1
(45) Date of Patent: Mar. 19, 2024

(54) PORT MANAGEMENT IN A HORIZONTALLY SCALED FILE TRANSFER SYSTEM

(71) Applicant: VMWARE, INC., Palo Alto, CA (US)

(72) Inventors: Rajagopal Sreenivasan, Bangalore (IN); Raghav Kempanna, Mountain View, CA (US); Sudarshana Kandachar Sridhara Rao, Bangalore (IN); Srinivasa Srikanth Podila, Bangalore (IN); Kumara Parameshwaran, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/122,234

(22) Filed: Mar. 16, 2023

(30) Foreign Application Priority Data

Jan. 11, 2023 (IN) .............................. 202341002276

(51) Int. Cl.
*H04L 67/561* (2022.01)
*H04L 67/06* (2022.01)

(52) U.S. Cl.
CPC ............ *H04L 67/561* (2022.05); *H04L 67/06* (2013.01)

(58) Field of Classification Search
CPC ..... H04L 67/56; H04L 67/561; H04L 67/562; H04L 67/06; H04L 67/01
See application file for complete search history.

(56) References Cited

U.S. PATENT DOCUMENTS

| | | | | |
|---|---|---|---|---|
| 6,865,680 B1 * | 3/2005 | Wu | ..................... | H04W 12/065 713/184 |
| 7,161,947 B1 * | 1/2007 | Desai | .................... | H04L 67/568 370/401 |
| 2010/0322252 A1 * | 12/2010 | Suganthi | ................. | H04L 69/12 709/237 |
| 2017/0085622 A1 * | 3/2017 | Gopinath | ............ | H04L 67/1001 |
| 2021/0185130 A1 * | 6/2021 | Paralikar | ................. | H04L 49/90 |
| 2022/0191254 A1 * | 6/2022 | Parasseeri | ............... | H04L 67/02 |

* cited by examiner

*Primary Examiner* — Jonathan A Bui

(74) *Attorney, Agent, or Firm* — Kim & Stewart LLP

(57) ABSTRACT

An example method of file transfer between a client and a server includes: initiating, by the client, a front-end control connection between the client and a horizontally scaled proxy service; creating, by a first proxy instance of a plurality of proxy instances of the horizontally scaled proxy service, a back-end control connection between the first proxy instance and the server; returning, to the client from the first proxy instance, a unique client parameter associated with the front-end connection as a destination port for a front-end data connection; initiating, by the client, the front-end data connection between the client and the horizontally scaled proxy service, the front-end data connection using the destination port as returned by the first proxy instance; and creating, by the first proxy instance, a back-end data connection between the first proxy instance and the server.

20 Claims, 4 Drawing Sheets

PORT MANAGEMENT IN A HORIZONTALLY SCALED FILE TRANSFER SYSTEM

RELATED APPLICATIONS

Benefit is claimed under 35 U.S.C. 119(a)-(d) to Foreign Application Serial No. 202341002276 filed in India entitled "PORT MANAGEMENT IN A HORIZONTALLY SCALED FILE TRANSFER SYSTEM", on Jan. 11, 2023, by VMware, Inc., which is herein incorporated in its entirety by reference for all purposes.

BACKGROUND

In a software-defined data center (SDDC), virtual infrastructure, which includes virtual compute, storage, and networking resources, is provisioned from hardware infrastructure that includes a plurality of host computers, storage devices, and networking devices. The provisioning of the virtual infrastructure is carried out by management software that communicates with virtualization software (e.g., hypervisor) installed in the host computers. SDDC users move through various business cycles, requiring them to expand and contract SDDC resources to meet business needs. This leads users to employ multi-cloud solutions, such as typical hybrid cloud solutions where the SDDC spans across an on-premises data center and a public cloud.

In some environments, users can access applications executing in an SDDC using a file transfer system. A typical file transfer system employs File Transfer Protocol (FTP), such as passive FTP. Passive FTP includes both a control connection and a data connection between a client and a server. The client first initiates the control connection with the server using a known port. The server returns a destination port for the data connection to the client over the control connection. The client then initiates the data connection with the server using the destination data port specified by the server.

In proxy solutions hosting FTP applications, the onus of managing connections between the client and the server rests with the proxy. The client initiates a control connection with the proxy using a known port of the proxy, and the proxy initiates a control connection with the server using a known port of the server. The server returns a destination data port for the data connection to the proxy. The proxy can return this destination data port to the client, which then initiates the data connection with the proxy using the destination data port. For the data and control connections, the proxy creates a mapping between its external interface (Internet Protocol (IP) address, port) accessible by the client and its internal interface (IP address, port) accessible by the server. In a device performing network address translation (NAT) (e.g., a firewall), such a mapping is referred to as a pinhole.

A problem occurs when the proxy comprises a horizontally scaled service having many instances executing concurrently. The client connects to the proxy service using a known IP address (e.g., a virtual IP address (VIP)) and the connection is handled by one of the proxy instances. A client can initiate multiple passive FTP connections with a server, which can be handled by multiple instances of the proxy service. The proxy service must perform management of the destination data ports returned to the client and ensure that the same destination data port is not returned to the client for multiple data connections. One solution is to employ a common shared database across all proxy instances to ensure that unique destination data ports are returned to the client. Shared databases, however, are cumbersome and require complex synchronization across potentially many proxy instances.

SUMMARY

In embodiments, a method of file transfer between a client and a server includes: initiating, by the client, a front-end control connection between the client and a horizontally scaled proxy service; creating, by a first proxy instance of a plurality of proxy instances of the horizontally scaled proxy service, a back-end control connection between the first proxy instance and the server; returning, to the client from the first proxy instance, a unique client parameter associated with the front-end connection as a destination port for a front-end data connection; initiating, by the client, the front-end data connection between the client and the horizontally scaled proxy service, the front-end data connection using the destination port as returned by the first proxy instance; and creating, by the first proxy instance, a back-end data connection between the first proxy instance and the server.

Further embodiments include a non-transitory computer-readable storage medium comprising instructions that cause a computer system to carry out the above method, as well as a computer system configured to carry out the above method.

DETAILED DESCRIPTION

Figure 1:
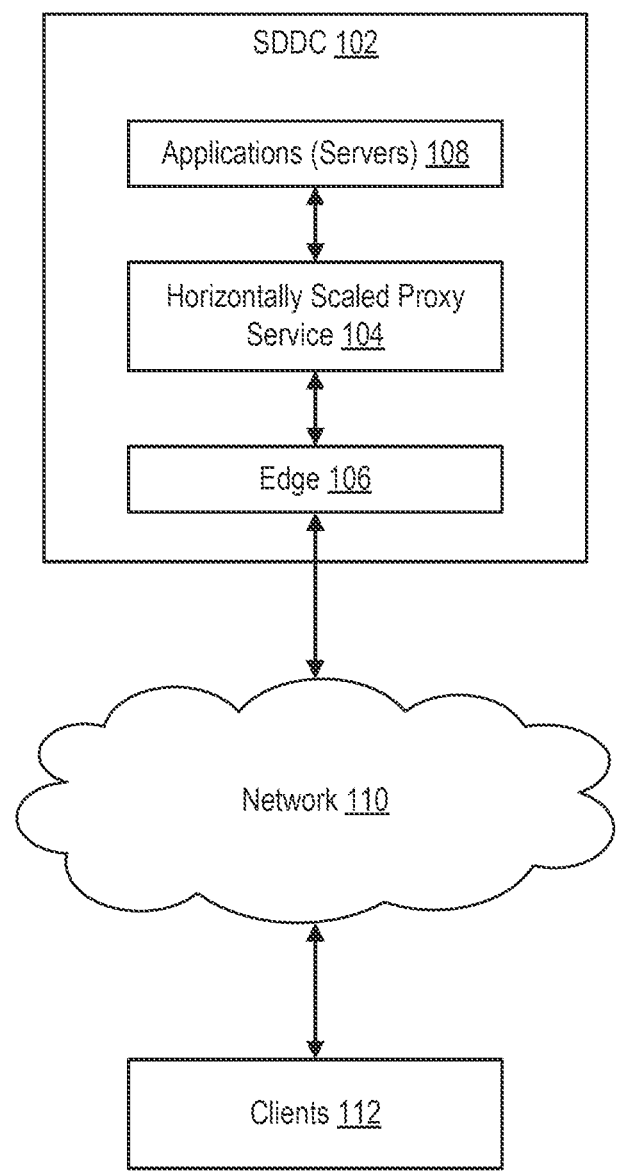
FIG. 1 is a block diagram depicting a file transfer system according to embodiments.
Figure 2:
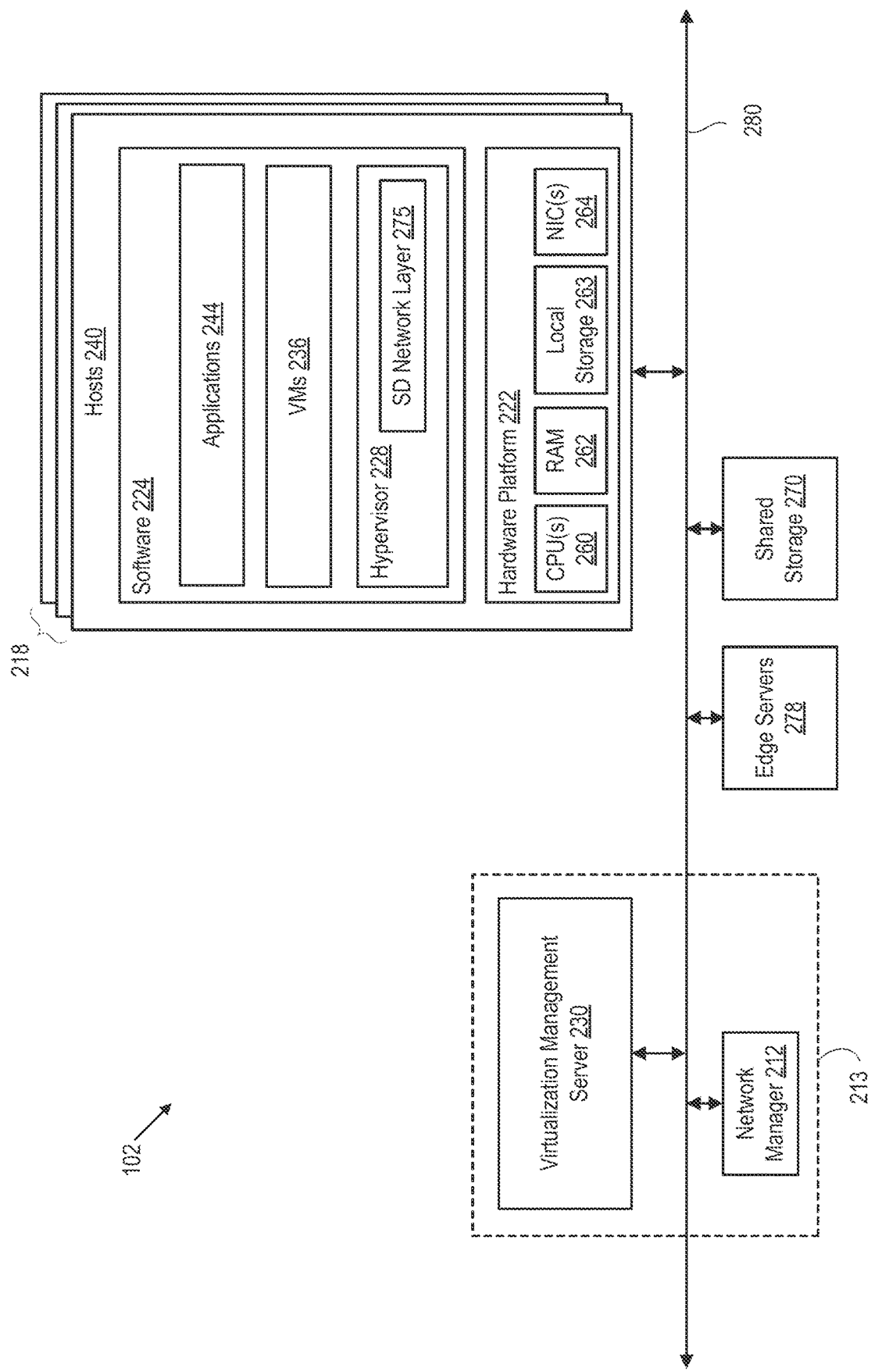
FIG. 2 is a block diagram of an SDDC in which embodiments described herein may be implemented.

FIG. 1 is a block diagram depicting a file transfer system 100 according to embodiments. File transfer system 100 includes a software-defined data center (SDDC) 102, a network 110, and clients 112. Clients 112 connect to SDDC 102 through network 110 (e.g., the public Internet, a corporate network, or the like). Clients 112 comprise computing devices having processors, memories, network interfaces, support devices, and the like. SDDC 102 includes host computers (hosts) an example of which is shown in FIG. 2 and described below. SDDC 102 executes on the hosts an edge 106, a horizontally scaled proxy service 104, and applications 108.

Clients 112 connect to applications 108, which function as servers, through horizontally scaled proxy service 104. Each proxied connection between a client 112 and an application 108 includes a control channel and a data channel. The control channel includes a control connection between client 112 and horizontally scaled proxy service 104 and a control connection between horizontally scaled proxy service 104 and application 108. The data channel includes a data connection between client 112 and horizontally scaled proxy service 104 and a data connection between horizontally scaled proxy service 104 and application 108. Horizontally scaled proxy service 104 facilitates the exchange of data between client 112 and application 108 over the control and data channels. Each proxied connection between client 112 and application 108 is passive. For a passive connection, a client 112 dynamically receives a port for the data connection to horizontally scaled proxy service 104 over the control connection. In embodiments, clients 112 and applications 108 use passive File Transfer Protocol (FTP) to establish proxied connections and transfer files.

Horizontally scaled proxy service 104 includes a plurality of instances executing concurrently. A client 112 can connect to any instance of horizontally scaled proxy service 104. Edge 106 selects which instance of horizontally scaled proxy service 104 to which client 112 connects.

FIG. 2 is a block diagram of an SDDC 102 in which embodiments described herein may be implemented. SDDC 102 includes a cluster of hosts 240 ("host cluster 218") that may be constructed on hardware platforms such as an x86 architecture platforms. For purposes of clarity, only one host cluster 218 is shown. However, SDDC 200 can include many of such host clusters 218. As shown, a hardware platform 222 of each host 240 includes conventional components of a computing device, such as one or more central processing units (CPUs) 260, system memory (e.g., random access memory (RAM) 262), one or more network interface controllers (NICs) 264, and optionally local storage 263. CPUs 260 are configured to execute instructions, for example, executable instructions that perform one or more operations described herein, which may be stored in RAM 262. NICs 264 enable host 240 to communicate with other devices through a physical network 280. Physical network 280 enables communication between hosts 240 and between other components and hosts 240 (other components discussed further herein).

In the embodiment illustrated in FIG. 2, hosts 240 access shared storage 270 by using NICs 264 to connect to network 280. In another embodiment, each host 240 contains a host bus adapter (HBA) through which input/output operations (IOs) are sent to shared storage 270 over a separate network (e.g., a fibre channel (FC) network). Shared storage 270 include one or more storage arrays, such as a storage area network (SAN), network attached storage (NAS), or the like. Shared storage 270 may comprise magnetic disks, solid-state disks, flash memory, and the like as well as combinations thereof. In some embodiments, hosts 240 include local storage 263 (e.g., hard disk drives, solid-state drives, etc.). Local storage 263 in each host 240 can be aggregated and provisioned as part of a virtual SAN (vSAN), which is another form of shared storage 270.

Software 224 of each host 240 provides a virtualization layer, referred to herein as a hypervisor 228, which directly executes on hardware platform 222. In an embodiment, there is no intervening software, such as a host operating system (OS), between hypervisor 228 and hardware platform 222. Thus, hypervisor 228 is a Type-1 hypervisor (also known as a "bare-metal" hypervisor). As a result, the virtualization layer in host cluster 218 (collectively hypervisors 228) is a bare-metal virtualization layer executing directly on host hardware platforms. Hypervisor 228 abstracts processor, memory, storage, and network resources of hardware platform 222 to provide a virtual machine execution space within which multiple virtual machines (VM) 236 may be concurrently instantiated and executed. Applications 244 execute in VMs 236.

Host cluster 218 is configured with a software-defined (SD) network layer 275 at least partially implemented by hypervisors 228. SD network layer 275 includes logical network services executing on virtualized infrastructure in host cluster 218. The virtualized infrastructure that supports the logical network services includes hypervisor-based components, such as resource pools, distributed switches, distributed switch port groups and uplinks, etc., as well as VM-based components, such as router control VMs, load balancer VMs, edge servers, etc. Logical network services include logical switches and logical routers, as well as logical firewalls, logical virtual private networks (VPNs), logical load balancers, and the like, implemented on top of the virtualized infrastructure. In embodiments. SDDC 102 includes edge servers 278 that provide an interface of host cluster 218 to a wide area network (WAN) (e.g., a corporate network, the public Internet, etc.). Edge servers 278 can be physical servers or VMs 236.

Virtualization management server 230 is a physical or virtual server that manages host cluster 218 and the virtualization layer therein. Virtualization management server 230 installs agent(s) in hypervisor 228 to add a host 240 as a managed entity. Virtualization management server 230 logically groups hosts 240 into host cluster 218 to provide cluster-level functions to hosts 240, such as VM migration between hosts 240 (e.g., for load balancing), distributed power management, dynamic VM placement according to affinity and anti-affinity rules, and high-availability. The number of hosts 240 in host cluster 218 may be one or many. Virtualization management server 230 can manage more than one host cluster 218.

In an embodiment. SDDC 102 further includes a network manager 212. Network manager 212 is a physical or virtual server that orchestrates SD network layer 275. In an embodiment, network manager 212 comprises one or more virtual servers deployed as VMs. Network manager 212 installs additional agents in hypervisor 228 to add a host 240 as a managed entity, referred to as a transport node. In this manner, host cluster 218 can be a cluster of transport nodes. One example of an SD networking platform that can be configured and used in embodiments described herein as network manager 212 and SD network layer 275 is a VMware NSX® platform made commercially available by VMware. Inc. of Palo Alto, CA.

Figure 3:
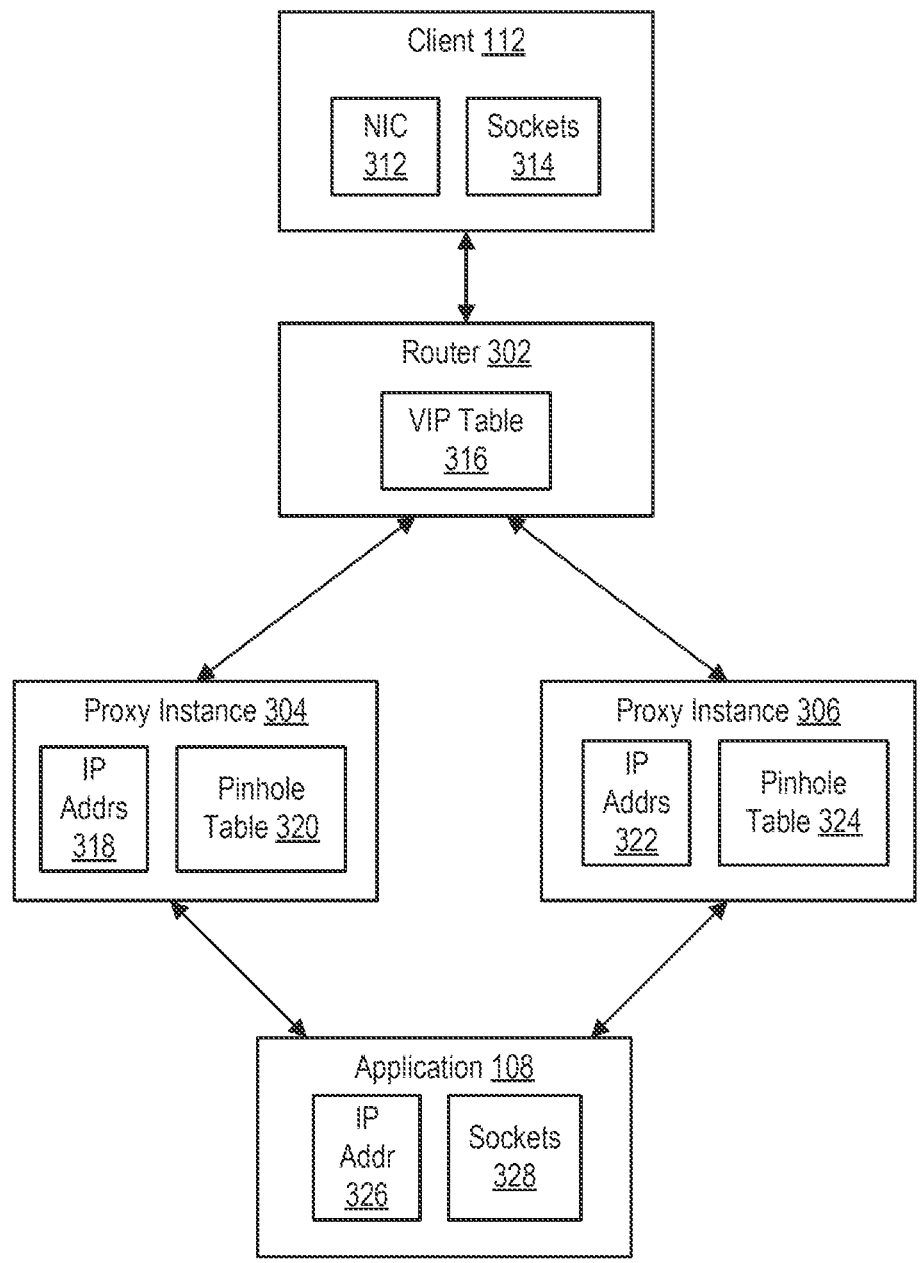
FIG. 3 is a block diagram depicting the file transfer system of FIG. 1 in more detail according to an embodiment.

FIG. 3 is a block diagram depicting the file transfer system of FIG. 1 in more detail according to an embodiment. A client 112 includes a network interface controller (NIC) 312. Client 112 maintains sockets 314 for connections to horizontally scaled proxy service 104. Sockets 314 describe connections between client 112 and horizontally scaled proxy service 104, including client internet protocol (IP) address, client port, proxy IP address, and proxy port. Router 302 can execute in an edge server 278 or as part of SD network layer 275. Router 302 includes a virtual IP table 316. Horizontally scaled proxy service 104 includes a virtual IP (VIP) address for use by client 112 in establishing connections. Horizontally scaled proxy service 104 includes a plurality of instances executing concurrently, for example, proxy instance 304 and proxy instance 306. While two instances are shown by example, horizontally scaled proxy service 104 can include any number of instances. For each connection request received from client 112 at the VIP of horizontally scaled proxy service 104, router 302 selects a proxy instance 304 to service the connection request. VIP table 316 includes mappings of the VIP with physical IP addresses of proxy instances 304.

Proxy instance 304 includes IP addresses 318 and pinhole table 320. One IP address 318 is used for the interface with router 302. Another IP address 318 is used for the interface with application 108. Pinhole table 320 includes information describing pinholes through proxy instance 304 through which client 112 communicates with application 108. Each pinhole defines an open port for the client connection and an open port for the application connection. Proxy instance 306 includes IP addresses 322 and pinhole table 324 each of which function the same as IP addresses 318 and pinhole table 320.

Application 108 includes an IP address 326 and sockets 328. Sockets 328 describe connections between application 12 and horizontally scaled proxy service 104, including server IP address, server port, proxy IP address, and proxy port.

The connection for file transfer can be described as follows. Consider the tuples for the connections of the control channel and the data channel. For the control channel, a tuple includes Client_IP:Client_PORT_A→Proxy_IP:FTP_PORT, where Client_IP is the IP address of client 112. PORT_A is the client port, Proxy_IP is the VIP of horizontally scaled proxy service 104, and FTP_PORT is an open port of horizontally scaled proxy service 104 known to client 112. The control channel also includes the tuple Proxy_Interface_IP:Ephemeral_port→Server_IP:FTP_PORT, where Proxy_Interface_IP is an IP address of a proxy instance, Ephemeral_port is a port selected by a proxy instance. Server_IP is an IP address of application 108, and FTP_PORT is an open port of application 108 (e.g., the same open port as horizontally scaled proxy service 104). For the data channel, a tuple includes Client_IP:Client_PORT_B→Proxy_IP:"X"→Proxy_Interface_IP:Ephmeral_port→Server_IP:FTP_DATA_PORT, where X is a port described below, and FTP_DATA_PORT is an open port of application 108 for receiving a data connection. FTP_DATA_PORT is dictated by application 108.

Consider if X is the same as FTP_DATA_PORT as selected by application 108. In such case, for one session, client will initiate a data connection to VIP:FTP_DATA_PORT, which will be handled by one of the proxy instances (e.g., proxy instance 304). Consider if client 112 establishes another session that is now handled by proxy instance 306. Application 108 can select the same FTP_DATA_PORT for the second session as the first session. However, in such case, the tuple describing the data connection between client 112 and horizontally scaled proxy service 104 is again VIP:FTP_DATA_PORT. Client 112 will not be able to distinguish between the two sessions as the data connections are described by the same tuple.

In embodiments, proxy instances 304 avoid this problem using techniques described herein. FTP protocol states that at any given point in time, there can be exactly one data connection for a control connection. A single control connection may have multiple data connections over a period of time, but at a given instant, there is a one-to-one relation between control and data connections. In embodiments, to avoid ambiguity as described above, each proxy instance 304 returns the data port to client 112 that is set equal to the client's port used for the control connection (Client_PORT_A in the example above). That is, X=Client_PORT_A. The source client port for the control connection is a unique parameter, as client 112 selects different source ports for the control connection for different concurrent sessions. In such case, there will be a unique tuple for the data connection of each concurrent session established by client 112 at the front-end between client 112 and horizontally scaled proxy service 104. This technique solves the port management problem for horizontally scaled proxy service 104 without the need for a shared database among the proxy instances. Using the client source port for the control connection as the destination port for the data connection is stateless and avoids the complexities associated with use of a shared database.

Figure 4:
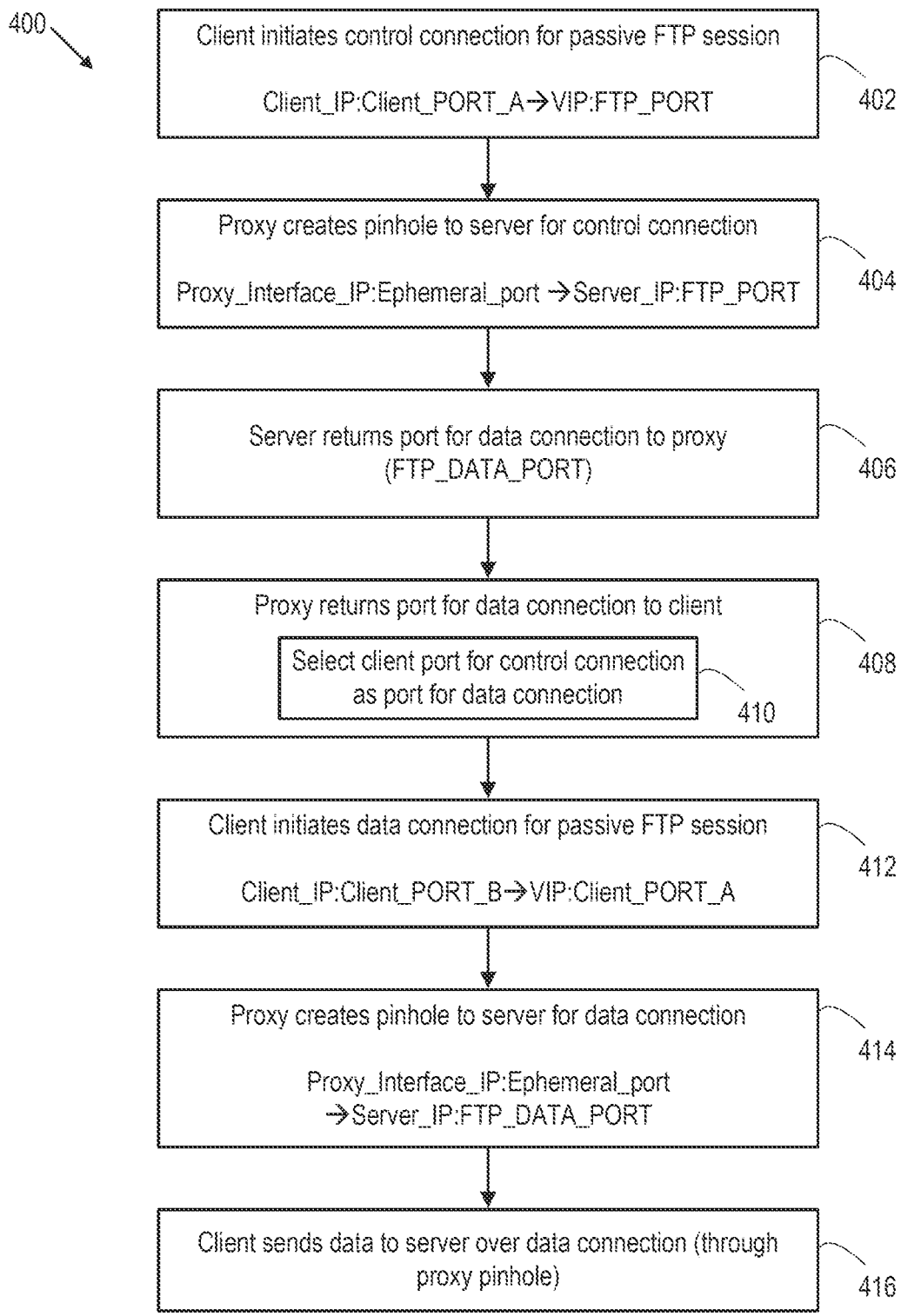
FIG. 4 is a flow diagram depicting a method of file transfer between a client and an application (server) according to embodiments.

FIG. 4 is a flow diagram depicting a method 400 of file transfer between a client and an application (server) according to embodiments. Method 400 begins at step 402, where client 112 initiates a control connection for a passive FTP session. While FTP is described in the example, any protocol that functions similarly in a passive mode can be employed. As noted above, in passive mode, the server (application 108) will return a port for the data connection over the control connection. The tuple for the front-end control connection between client 112 and horizontally scaled proxy service 104 is Client_IP:Client_PORT_A→VIP:FTP_PORT as described above.

At step 404, a proxy instance of horizontally scaled proxy service 104 creates a pinhole to the server (application 108) for the control channel. The tuple for the back-end control connection between the proxy instance and the server (application 108) is Proxy_Interface_IP:Ephemeral_port→Server_IP:FTP_PORT as described above.

At step 406, the server (application 108) returns a port for the back-end data connection to the proxy instance (according to the passive mode). This port is referred to as FPT_DATA_PORT in the example and can be the same port number used for control connections by horizontally scaled proxy service 104 (e.g., a well-known port by clients 112).

At step 408, the proxy instance returns a port for the front-end data connection to client 112. In embodiments, at step 410, the proxy instance selects the client source port for the front-end control connection as the destination port for the front-end data connection. At step 412, client 112 initiates a data connection for the passive FTP session. The tuple for the front-end data connection between client 112 and horizontally scaled proxy service 104 is Client_IP:Client_PORT_B→VIP:Client_PORT_A as discussed above. That is, the destination port for the front-end data connection is the same as the source port for the front-end control connection (i.e., the port numbers are the same). While the data destination port for the front-end connection is described as being the source port for the control connection, those skilled in the art will appreciate that any unique parameter set by the client can be used.

At step 414, the proxy instance creates a pinhole to the server (application 108) for the data channel. The tuple for the back-end data connection between the proxy instance and the server (application 108) is Proxy_Interface_IP:Ephemeral_port→Server_IP:FTP_DATA_PORT as described above. At step 416, client 112 sends data to the server (application 108) over the data channel (e.g., through the front-end data connection, pinhole, and back-end data connection).

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of file transfer between a client and a server, comprising:
   initiating, by the client, a front-end control connection between the client and a horizontally scaled proxy service;
   creating, by a first proxy instance of a plurality of proxy instances of the horizontally scaled proxy service, a back-end control connection between the first proxy instance and the server;
   returning, to the client from the first proxy instance, a unique client parameter associated with the front-end connection as a destination port for a front-end data connection;
   initiating, by the client, the front-end data connection between the client and the horizontally scaled proxy service, the front-end data connection using the destination port as returned by the first proxy instance; and
   creating, by the first proxy instance, a back-end data connection between the first proxy instance and the server.

2. The method of claim 1, wherein the unique client parameter is a source port of the front-end control connection.

3. The method of claim 1, wherein a destination Internet Protocol (IP) address of the front-end control connection and the front-end data connection is a virtual IP (VIP) address of the horizontally scaled proxy service, and wherein a router selects the first proxy instance of the plurality of proxy instances in response to initiation of the front-end connection by the client to the VIP.

4. The method of claim 1, further comprising:
   returning, by the server to the first proxy instance, a destination port for the back-end data connection;
   wherein the first proxy instance creates the back-end data connection to the destination port as returned by the server.

5. The method of claim 1, further comprising:
   initiating, by the client, another front-end control connection between the client and the horizontally scaled proxy service;
   creating, by a second proxy instance of the plurality of proxy instances, another back-end control connection between the second proxy instance and the server; and
   returning, to the client from the second proxy instance, another unique client parameter associated with the other front-end connection as a destination port for another front-end data connection.

6. The method of claim 5, wherein the other unique client parameter is a source port of the other front-end control connection that is different from the source port of the front-end control connection.

7. The method of claim 1, wherein the first proxy instance includes a first IP address mapped by the router to the VIP, and a second IP address that is a source IP address for the back-end control connection and the back-end data connection.

8. A non-transitory computer readable medium comprising instructions to be executed in a computing device to cause the computing device to carry out a method of file transfer between a client and a server, comprising:
   initiating, by the client, a front-end control connection between the client and a horizontally scaled proxy service;
   creating, by a first proxy instance of a plurality of proxy instances of the horizontally scaled proxy service, a back-end control connection between the first proxy instance and the server;
   returning, to the client from the first proxy instance, a unique client parameter associated with the front-end connection as a destination port for a front-end data connection;
   initiating, by the client, the front-end data connection between the client and the horizontally scaled proxy service, the front-end data connection using the destination port as returned by the first proxy instance; and
   creating, by the first proxy instance, a back-end data connection between the first proxy instance and the server.

9. The non-transitory computer readable medium of claim 8, wherein the unique client parameter is a source port of the front-end control connection.

10. The non-transitory computer readable medium of claim 8, wherein a destination Internet Protocol (IP) address of the front-end control connection and the front-end data connection is a virtual IP (VIP) address of the horizontally scaled proxy service, and wherein a router selects the first proxy instance of the plurality of proxy instances in response to initiation of the front-end connection by the client to the VIP.

11. The non-transitory computer readable medium of claim 8, further comprising:
returning, by the server to the first proxy instance, a destination port for the back-end data connection;
wherein the first proxy instance creates the back-end data connection to the destination port as returned by the server.

12. The non-transitory computer readable medium of claim 8, further comprising:
initiating, by the client, another front-end control connection between the client and the horizontally scaled proxy service;
creating, by a second proxy instance of the plurality of proxy instances, another back-end control connection between the second proxy instance and the server; and
returning, to the client from the second proxy instance, another unique client parameter associated with the other front-end connection as a destination port for another front-end data connection.

13. The non-transitory computer readable medium of claim 12, wherein the other unique client parameter is a source port of the other front-end control connection that is different from the source port of the front-end control connection.

14. The non-transitory computer readable medium of claim 8, wherein the first proxy instance includes a first IP address mapped by the router to the VIP, and a second IP address that is a source IP address for the back-end control connection and the back-end data connection.

15. A file transfer system, comprising:
a client;
a router connected to the client through a network;
a plurality of proxy instances of a horizontally scaled proxy service connected to the router;
an application executing as a server connected to a first proxy instance of the plurality of proxy instances;
wherein:
the client initiates a front-end control connection between the client and the horizontally scaled proxy service;
the first proxy instance creates a back-end control connection between the first proxy instance and the server;
the first proxy instance returns to the client a unique client parameter associated with the front-end connection as a destination port for a front-end data connection;
the client initiates the front-end data connection between the client and the horizontally scaled proxy service, the front-end data connection using the destination port as returned by the first proxy instance; and
the first proxy instance creates a back-end data connection between the first proxy instance and the server.

16. The file transfer system of claim 15, wherein the unique client parameter is a source port of the front-end control connection.

17. The file transfer system of claim 15, wherein a destination Internet Protocol (IP) address of the front-end control connection and the front-end data connection is a virtual IP (VIP) address of the horizontally scaled proxy service, and wherein a router selects the first proxy instance of the plurality of proxy instances in response to initiation of the front-end connection by the client to the VIP.

18. The file transfer system of claim 15, wherein:
the server returns to the first proxy instance a destination port for the back-end data connection;
the first proxy instance creates the back-end data connection to the destination port as returned by the server.

19. The file transfer system of claim 15, wherein:
the client initiates another front-end control connection between the client and the horizontally scaled proxy service;
a second proxy instance of the plurality of proxy instances creates another back-end control connection between the second proxy instance and the server; and
the second proxy instance returns to the client another unique client parameter associated with the other front-end connection as a destination port for another front-end data connection.

20. The file transfer system of claim 19, wherein the other unique client parameter is a source port of the other front-end control connection that is different from the source port of the front-end control connection.

* * * * *